(12) United States Patent
Baron et al.

(10) Patent No.: US 10,942,801 B2
(45) Date of Patent: *Mar. 9, 2021

(54) APPLICATION PERFORMANCE MANAGEMENT SYSTEM WITH COLLECTIVE LEARNING

(71) Applicant: Instana, Inc., Redwood City, CA (US)

(72) Inventors: Pavlo Baron, Munich (DE); Fabian Lange, Solingen (DE); Mirko Novakovic, Solingen (DE); Peter Abrams, Belmont, CA (US)

(73) Assignee: Instana, Inc., Redwood City, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/394,251

(22) Filed: Apr. 25, 2019

(65) Prior Publication Data

US 2020/0117530 A1    Apr. 16, 2020

Related U.S. Application Data

(63) Continuation of application No. 15/179,197, filed on Jun. 10, 2016, now Pat. No. 10,318,369.

(60) Provisional application No. 62/174,230, filed on Jun. 11, 2015.

(51) Int. Cl.
```
G06F 11/00    (2006.01)
G06F 11/07    (2006.01)
G06N 20/00    (2019.01)
```
(52) U.S. Cl.
CPC ............ *G06F 11/079* (2013.01); *G06F 11/00* (2013.01); *G06F 11/0709* (2013.01); *G06F 11/0751* (2013.01); *G06N 20/00* (2019.01)

(58) Field of Classification Search
CPC ...... G06F 12/12; G06F 12/121; G06F 12/127; G06F 11/079; G06F 11/0709; G06F 11/0751; G06F 11/00
See application file for complete search history.

(56) References Cited

U.S. PATENT DOCUMENTS

| | | |
|---|---|---|
| 5,537,542 A | 7/1996 | Eilert et al. |
| 5,619,656 A | 4/1997 | Graf |
| 6,148,335 A | 11/2000 | Haggard et al. |

(Continued)

OTHER PUBLICATIONS

United States Court of Appeals for the Federal Circut, "*Electric Power Group, LLC* v *Alstom S.A., Alstom Grid, Inc., Psymetrix, Ltd., Alstom Limited*", Appeal from the United States District Court for the Central District of California, Aug. 1, 2016, pp. 1-12, United States.

*Primary Examiner* — Jonathan D Gibson

(57) ABSTRACT

An application performance management system is disclosed. Operational elements are dynamically discovered and extended when changes occur. Programmatic knowledge is captured. Particular instances of operational elements are recognized after changes have been made using a fingerprint/signature process. Metrics and metadata associated with a monitored operational element are sent in a compressed form to a backend for analysis. Metrics and metadata from multiple similar systems may be used to adjust/create expert rules to be used in the analysis of the state of an operational element. A 3-D user interface with both physical and logical representations may be used to display the results of the performance management system.

20 Claims, 8 Drawing Sheets

(56) References Cited

U.S. PATENT DOCUMENTS

| | | | |
|---|---|---|---|
| 7,882,216 B2 | 2/2011 | Houlihan et al. | |
| 9,262,255 B2 * | 2/2016 | Hampapur et al. | |
| 10,318,369 B2 * | 6/2019 | Baron | G06F 11/0709 |
| 10,339,457 B2 * | 7/2019 | Ryckbosch | G06F 11/0706 |
| 2005/0183143 A1 | 8/2005 | Anderholm et al. | |
| 2008/0037761 A1 | 2/2008 | Cordell et al. | |
| 2009/0276771 A1 | 11/2009 | Nickolov et al. | |
| 2014/0040173 A1 * | 2/2014 | Sagher | G06K 9/00771 |
| | | | 706/12 |
| 2015/0365309 A1 | 12/2015 | Kaminski et al. | |
| 2016/0110239 A1 * | 4/2016 | Couture | G06F 11/0709 |
| | | | 714/37 |
| 2016/0274961 A1 | 9/2016 | Satish et al. | |

* cited by examiner

APPLICATION PERFORMANCE MANAGEMENT SYSTEM WITH COLLECTIVE LEARNING

RELATED APPLICATIONS

This application is a continuation of, and claims priority to U.S. patent application Ser. No. 15/179,197, filed Jun. 10, 2016, entitled "APPLICATION PERFORMANCE MANAGEMENT SYSTEM WITH COLLECTIVE LEARNING," which also claims the benefit of and priority to U.S. Provisional Patent Application No. 62/174,230, filed Jun. 11, 2015, entitled "APPLICATION PERFORMANCE MANAGEMENT SYSTEM WITH COLLECTIVE LEARNING," each of which is hereby incorporated by reference in their entirety.

TECHNICAL FIELD

Aspects of the disclosure are related to computer system performance and in particular to the detection and diagnosis of application performance problems.

TECHNICAL BACKGROUND

As computer systems get larger and larger, as do their applications, the difficulty in monitoring all of the various applications on a system also increases. In particular, some systems may be distributed geographically (for example, in cloud computing), and multiple applications may run on multiple processors within a single computer system.

Further, these computer systems may be dynamically configured, with applications moving between processors as necessary. Additionally, the physical computer system may be dynamically configured with additional processors brought online as needed by the various applications. Monitoring such systems is extremely complex and it is difficult to configure monitoring systems such that they sufficiently monitor all of the various applications, provide a user sufficient and easily understandable alerts, and possibly to automatically repair some application problems.

OVERVIEW

In an embodiment, an application performance management system including a communication interface and a processing system is provided. The communication interface is configured to communicate with an agent deployed within a target computing system.

The processing system is coupled with the communication interface, and is configured to receive first metrics associated with a first operational element executing within a first target computing system from a first agent, and to receive second metrics associated with a second operational element executing within a second target computing system from a second agent, wherein the second operational element is in a class of operational elements including the first operational element.

The processing system is also configured to process the first and second metrics to determine a performance relevant pattern related to the class of operational elements including the first and second operational elements, and to modify an algorithm for detecting performance issues within the class of operational elements based on the performance relevant pattern. The processing system is further configured to receive third metrics associated with the first operational element, and to apply the modified algorithm for detecting performance issues to the third metrics to detect performance issues for the first operational element.

In another embodiment, a method of managing operational elements executing within a target computing system is provided. The method includes receiving first metrics associated with a first operational element executing within a first target computing system from a first agent, and receiving second metrics associated with a second operational element executing within a second target computing system from a second agent, wherein the second operational element is in a class of operational elements including the first operational element.

The method also includes processing the first and second metrics to determine a performance relevant pattern related to the class of operational elements including the first and second operational elements, and modifying an algorithm for detecting performance issues within the class of operational elements based on the performance relevant pattern. The method further includes receiving third metrics associated with the first operational element, and applying the modified algorithm for detecting performance issues to the third metrics to detect performance issues for the first operational element.

In a further embodiment, one or more non-transitory computer-readable media having stored thereon program instructions to operate an application performance management system is provided. The program instructions, when executed by processing circuitry, direct the processing circuitry to at least receive first metrics associated with a first operational element executing within a first target computing system from a first agent, and to receive second metrics associated with a second operational element executing within a second target computing system from a second agent, wherein the second operational element is in a class of operational elements including the first operational element.

The program instructions also direct the processing circuitry to at least process the first and second metrics to determine a performance relevant pattern related to the class of operational elements including the first and second operational elements, and to modify an algorithm for detecting performance issues within the class of operational elements based on the performance relevant pattern. The program instructions further direct the processing circuitry to at least receive third metrics associated with the first operational element, and to apply the modified algorithm for detecting performance issues to the third metrics to detect performance issues for the first operational element.

In another embodiment, a method of identifying a status for an operational element, includes collecting a first plurality of metrics associated with a first operational element running on a first host. A second plurality of metrics associated with a second operational element running on a second host is also collected. An expert rule is modified based on the first plurality of metrics and the second plurality of metrics. The modified expert rule is applied to determine a selected status for the first operational element.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple examples are described in connection with these drawings, the disclosure is not limited to the examples disclosed herein. On the contrary, the intent is to cover all alternatives, modifications, and equivalents.

DETAILED DESCRIPTION

Application Performance Management (APM) is the monitoring and management of performance and availability of operational elements (e.g., software applications, their components, and dependencies.) APM strives to detect and diagnose application performance problems to maintain an expected level of service.

In an embodiment, a dynamic discovery agent is installed by a user onto a client machine. This agent can act as a proxy between the client machine and the backend application management systems/processes. The dynamic discovery agent detects the software/hardware environment of the client machine. The agent may detect the software/hardware environment of a client machine using knowledge, fingerprints, correlation, and/or other techniques. Once the software/hardware environment of the client machine is determined, the agent can deploy sensors for monitoring the client machine. The software/hardware environment can include the applications, drivers, virtual machines, network types, hardware/software elements, operating systems, and other elements or other contextual factors associated with a client machine. Discovered software/hardware elements may be used with automated or semi-automated extension of the processing and learning backend with corresponding knowledge, processing and storage components.

Figure 1:
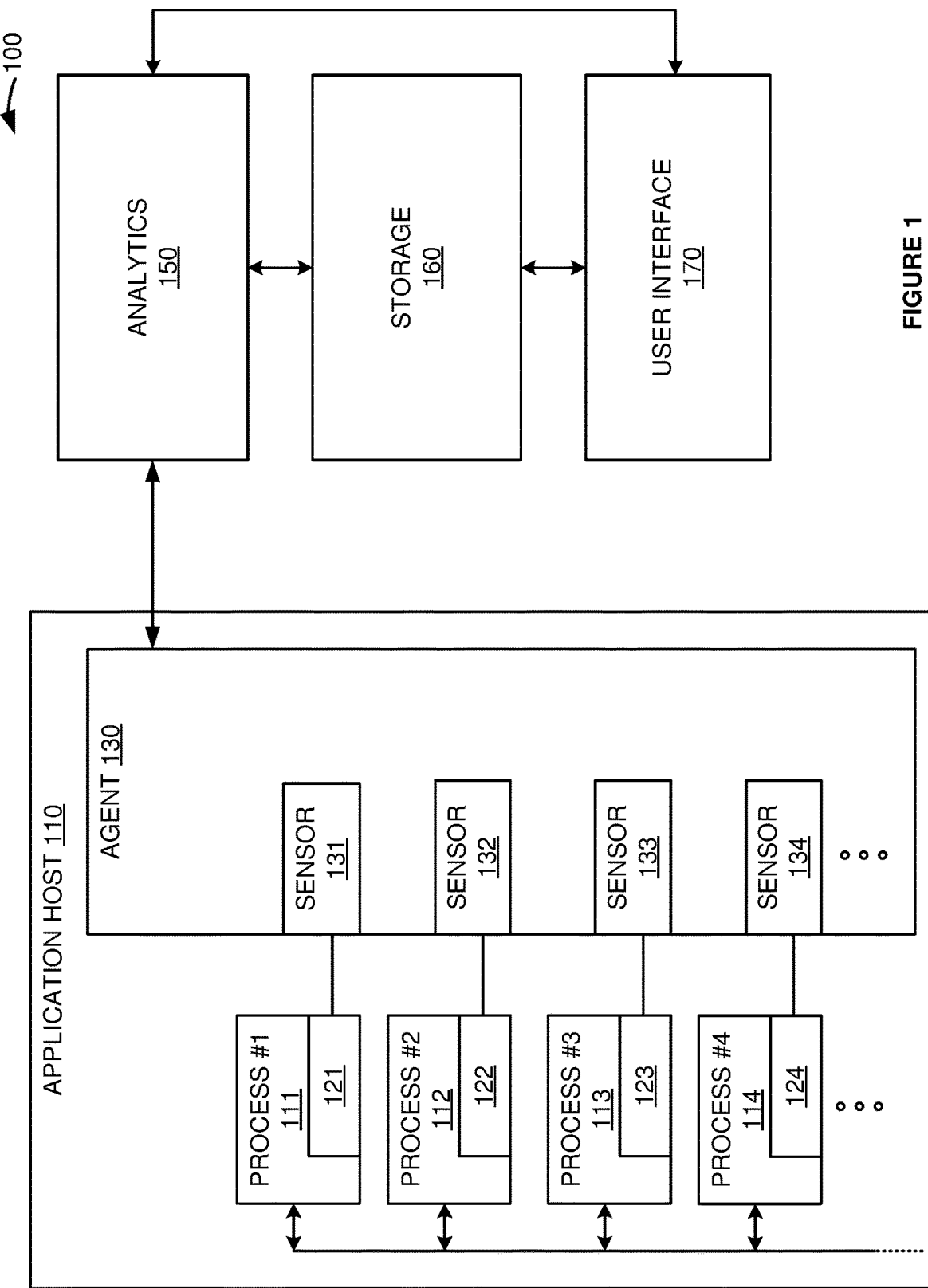
FIG. 1 is a block diagram illustrating an application performance management system.

FIG. 1 is a block diagram illustrating an application performance management system. In FIG. 1, application performance management system 100 comprises application host 110, analytics, 150, storage 160, and user interface 170. Application host 110 is running or can run agent 130, process #1 111, process #2 112, process #3 113, and process #4 114. Application host 110 can be running or can run additional processes not shown in FIG. 1.

Agent 130 includes sensors 131-134. Process #1 111 has interface 121. Process #2 112 has interface 122. Process #3 113 has interface 123. Process #4 114 has interface 124. Sensor 131 of agent 130 is operatively coupled to interface 121. Sensor 132 of agent 130 is operatively coupled to interface 122. Sensor 133 of agent 130 is operatively coupled to interface 123. Sensor 134 of agent 130 is operatively coupled to interface 124.

Sensors 131-134 "run" within agent 130. Sensors 131-134 can be code executed by agent 130 itself, for example, periodically. In an example, sensor 131 can be for collecting data from the host 110 operating system (OS). In another example, sensor 132 can be for collecting data from agent 130 itself. Other sensors (e.g., sensors 133-134, etc.) may depend on the technology/software/operational element/etc. the sensor 131-134 senses. Thus, a particular sensor 131-134 may be executed from within the element it is sensing (i.e., act as an interface 121-124). For example, sensor 133 may run within a java virtual machine (JVM). A particular sensor 131-134 may also be a separate process on host 110. If needed, a sensor running as a separate process from agent 130, may report to agent 130.

In an embodiment, agent 130 is executed on host 110. Agent 130 is an intelligent proxy between host 110 and backend systems/functions illustrated as processing 150, storage 160, and user interface 170. Agent 130 performs "discovery". Discovery is a process that recognizes elements (system, software, communications etc.) on Host 110. For example, the discovery process may find a running copy of an application called "JIRA." The discovery process may find that host 110 has 32 GB of memory and runs the Linux operating system.

For the discovered operational elements, agent 130 requests a specific "sensor" and installs the sensor. The sensor is installed in agent 130, or as an interface 121-124 to a corresponding process 111-114, as appropriate. A sensor 131-134 periodically provides metrics and meta information to agent 130. In the example of JIRA, multiple sensors are requested, such as sensors to interface with Java, Tomcat, MySQL etc. processes and/or executables.

Periodically (for example, once every second), agent 130 collects metrics and meta information from sensors 131-134 that have data to send. The periodic message with data from sensors 131-134 to processing 150, storage 160, and/or user interface 170 (collectively "backend") may be referred to as a "raw message." In the example of JIRA, a raw message contains information/metrics of host 110, a Java process (e.g., process 113), the Tomcat web container running in the process (e.g., process 114), etc.

In an embodiment, raw data on operational elements is collected frequently by individual sensors deployed onto host 110. This raw sensor data is condensed into baselines and subsequent delta (change) information for transfer to the backend application performance management systems. This reduces transfer bandwidth. The delta information can be determined based on context, status, or other information of the current state of host 110's operational elements, thereby only transferring relevant delta information to the backend systems. For example, metrics that remain unchanged do not get transferred, only changes in metric values are transferred. This delta information may be referred to as "delta metrics," "metrics deltas," "changes in metric values," or the like.

Raw data is captured and held temporarily by agent 130, but may be eventually purged after a period of time if not needed and requested by processing 150, or UI 170, for further analysis and/or display. Storage 160 may archive raw messages to a disk or other long-term storage. Processing 150 may immediately process the raw messages in order to recognize issues and/or provide suggested fixes.

Processing 150 can extract information needed to do issue recognition and fix suggestion. This information can be extracted for one particular operational element, or groups of elements. This information can include, but is not limited to: (1) inventory information needed to fill an abstract infrastructure idea with concrete names and instances; and, (2) a set of metric values that is limited to those needed for issue recognition, etc. In the example of JIRA, many metrics can be relevant to identify an issue. These include, for example, host metrics around CPU and memory, Java metrics around garbage collection and performance, Tomcat metrics around pools and named resources, MySQL metrics around database performance and bottlenecks, and the like. These metrics can be extracted by independent means, so the status of JIRA can be analyzed independently of the status host 110, ignoring all components in between.

In an embodiment, sets of metric values are collected into groups (a.k.a., "windows") to simulate data samples on data streams. A window is a time-ordered set of metric values. Once collected and/or full according to configurable rules, the whole set of samples in the window can be sent through a number of functions. These functions can run statistical algorithms on the data in the window. For example, the function may calculate a simple 5-numbers computation, more sophisticated linear regression, exponential smoothing, and/or outlier detection.

Further, users may replay the time-ordered set of metric values in a "timeshift" in order to see the history of the operational elements and the infrastructure of the system as captured by the sensors. This timeshift allows a user to examine metrics related to one or more operational elements during the time surrounding a performance issue or error.

The results of an analysis of the data in a window can be sent to other functions to make higher-order decisions, etc. For the example of JIRA, a JIRA status recognition function computes everything related to JIRA. In addition, a higher-order function can "wait" for results from Tomcat status analysis as well. The Tomcat status is again computed by a corresponding function based on pure Tomcat metrics plus JVM metrics and the like. This processing may proceed in a hierarchical manner from the highest level (e.g., the application—JIRA) down to the lowest possible level (e.g., host 110 hardware).

For example, a result of a JIRA check can be "JIRA status." 'Status' can be as simple as "how it feels right now according to memory data" or as complex as "it's yellow if we're out of memory in 3 minutes, and meanwhile the disk gets full and we can't get any new database connection through for the past 5 minutes." Status can be displayed as a color: green, yellow or red, plus all the information hierarchically collected in order to recognize an issue and provide a fix suggestion. An example output of a check process is shown in Table 1.

TABLE 1

JIRA issues:
  not enough memory;
  too many connections open;
  too large memory consumption in plugin XYZ
JIRA fix suggestion:
  increase memory on host;
  increase maximum available memory for the JVM process;
  uninstall plugin XYZ Once a status is computed, it can be stored in storage 160 together with the timestamp. In this manner, users can query through user interface 170 to ask questions such as "how did feel JIRA yesterday at 10 pm?" or "what's the normal behavior of JIRA through the whole day?"

In addition, a status can be sent to user interface 170 for real-time representation by user interface 170. For the example of JIRA, a status (e.g., red, yellow, green) is published such that the user will see the color identifying the hot spot in JIRA in the corresponding part of a map. The display may also include clickable information about the issue and the possible fix.

In an embodiment, a user can decide that an issue is not identified with enough precision and/or clarity. In this case the user may request deeper analysis. More detailed information can be transferred from host 110 to the backend. This more detailed information can be analyzed manually, or automated, depending on the situation. For example, analysis of the bottleneck in the plugin XYZ in JIRA can theoretically be done completely automated.

A user can also label an issue identified by system 100 as "not an issue" or overrule a status and/or color (i.e., specify the problem should be considered red instead of yellow). This feedback by a user can be used to automatically adjust issue recognition parameters and algorithms in processing 150. The parameters and algorithms can be adjusted such that the same (or similar) issue can be identified and status selected that corresponds to user's expectations and/or experience—thus avoiding false positive or negatives that are unique to a user and/or host 110.

In an embodiment, processing 150 may be given information that abstractly describes dependencies, connections and hierarchies between operational elements. For example, a hierarchy describing JIRA is that JIRA runs in a web container. This web container is a process running on the JVM platform. The JVM platform is a process running within a container. The container is an element running on a host. An example of a horizontal dependency from this hierarchy is that JIRA requires a database and is not able to run without one. Thus, system 100 allows the specification of rules and/or heuristics that: (1) help extract data from raw messages; (2) analyze this data for patterns and anomalies; and, (3) send out recommendations for problem fixes based on the abstract topology description. These rules and/or heuristics may be specified and/or modified using a "dynamic graph" function performed by processing 150. The dynamic graph function may be used in conjunction with a timeshift such that the complete state of the system, including all of the metrics, may be shifted back in time as desired by a user.

For example, JIRA relies on a database. At runtime, processing 150 may have found that a MySQL instance is what JIRA uses as database. This instance may turn red due to low available memory. One rule is that system 100 can colorize MySQL when MySQL has low memory. JIRA, for example, has been configured so that when JIRA's database turns red, JIRA should put itself to yellow. JIRA should put itself to yellow because otherwise it will not function properly. Thus, each operational element can contribute to the overall picture.

In other words, knowledge capture as implemented by system 100 describes abstract dependencies between operational elements, defines how to resolve these dependencies at runtime, determines what data to look at, and determines how to make decisions based on available data.

System 100 can also collect issues and fix suggestions hierarchically—from the bottom up. For example, MySQL is red because, on the host running MySQL, a disk is full. JIRA is yellow because the MySQL database was turned red. Thus, the user can see a list of problems, beginning with "disk on XYZ is full", then "MySQL instance has issues writing data", and "JIRA will not function correctly, storing data is too slow or is unreliable." This function of collecting issues and repair suggestions hierarchically is performed as a dynamic graph method in some embodiments of the invention. "Incidents" are issues and repair suggestions that are grouped hierarchically within the dynamic graph.

Processing 150 may also use information about setups, issues in combination with elements, their versions, typical behaviors, etc. from multiple hosts 110 (and/or customers) to improve the parameters and algorithms used by processing 150. In other words, knowledge collected from several customers and/or hosts 110 can be aggregated and/or integrated such that customer A can benefit from experiences with a similar system of customer B. Data collected at any level may be processed (e.g., manually) to provide even better, more precise algorithms to identify issues and find possible fixes. Once again, a dynamic graph function may be used to improve the parameters and algorithms used to identify issues and find possible fixes.

Figure 2:
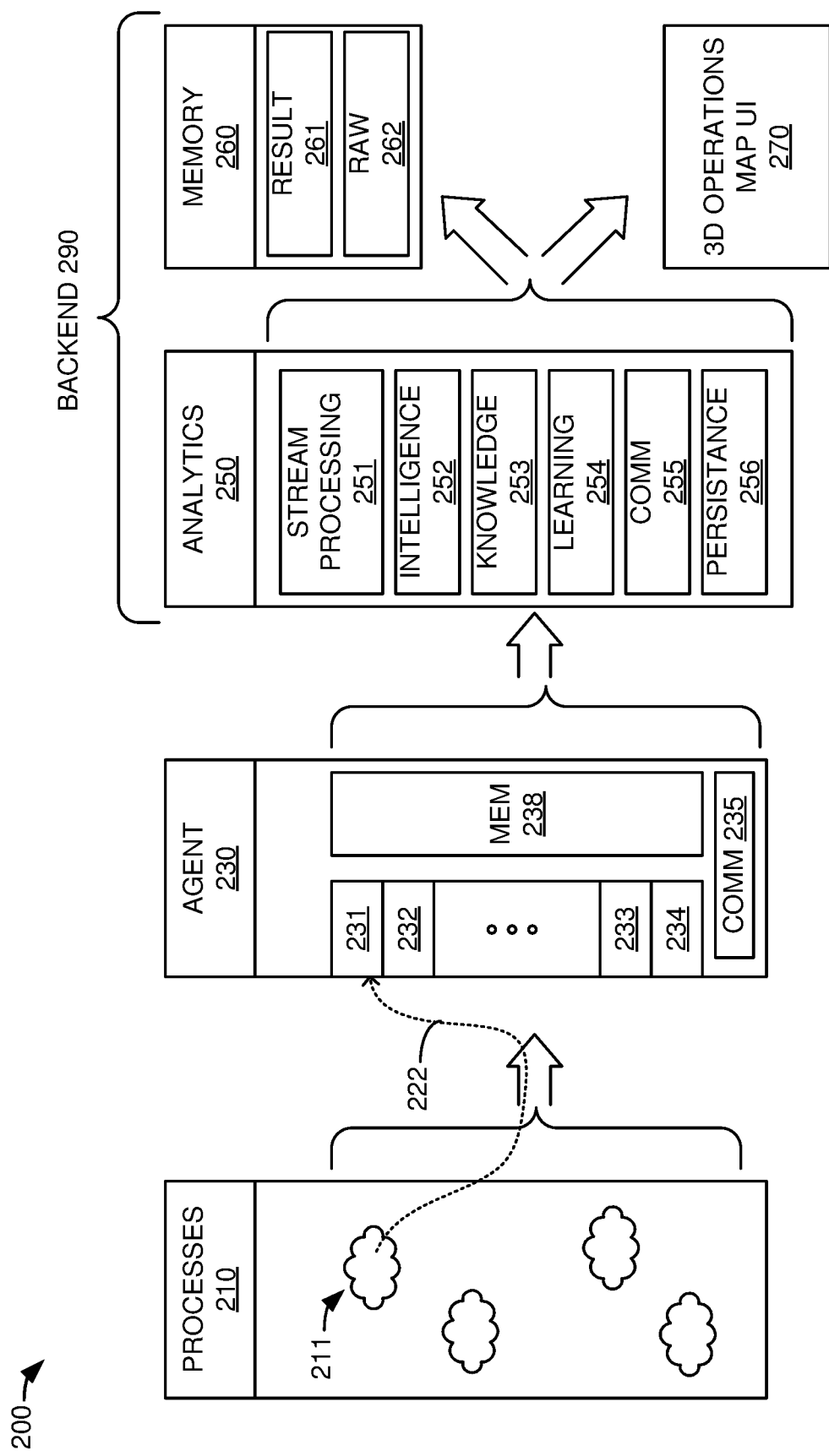
FIG. 2 is a diagram illustrating components of an application performance management system.

FIG. 2 is a diagram illustrating components of an application performance management system. In FIG. 2, system 200 comprises processes 210, agent 230, processing 250, memory 260, and 3-dimensional operations map user interface 270. The operational elements of processing 250, memory 260, and user interface 270 in FIG. 2 may be referred to as the backend 290 of system 200. In FIG. 2, processes 210 represent functions, applications, operating system, service, software layers, daemons, etc. that are targets for monitoring by system 200. Processes 210 include process 211. Agent 230 includes sensors 231-234, communication 235, and memory 238. Processing 250 includes stream processing 251, intelligence 252, knowledge 253, learning 254, communication 255, and persistence 256. Memory 260 includes result memory 261 and raw memory 262.

Processes 210 are operatively coupled to agent 230. Each of processes 210 is operatively coupled to a sensor 231-234, respectively. For example, as shown by arrow 222, process 211 may be operatively coupled to sensor 231. Process 211 may be operatively coupled to sensor 231 to provide agent 230 with responses to queries, and/or other information and/or metrics to be recorded and analyzed by backend 290.

Agent 230 is operatively coupled to processing 250. Processing 250 is operatively coupled user interface 270. Processing 250 is operatively coupled to memory 260. Thus, processing 250 is operatively coupled to result memory 261 and raw memory 262.

In an embodiment, application performance management system 200 can recognize operational elements. In order to recognize operational elements running on a host and/or the host itself, system 200 (and agent 230 and processing 250, in particular) develops a 'fingerprint' or 'signature' that can be used to recognize operational elements after one or more of the following: (1) temporary outages; (2) processes that repeatedly execute for a short lifetime; (3) addition or removal of elements in a cluster by the same or similar elements; and (4) movement of elements and sub-elements (such as applications or containers) for one network location (e.g., IP address, domain, /24 IP subnet, etc.) to another.

Further, information about changes in infrastructure, including abstract dependencies between operational elements, may be periodically transferred to the backend application performance management systems in a manner similar to that of the delta metrics from the individual sensors. For example, once infrastructure information has been transferred to the backend application performance management systems, only changes in infrastructure and dependencies are then transferred.

For example, system 200 can recognize a host (i.e., an operating system instance on some host machine) in a way that when this type of host only exists once in the whole infrastructure, and its IP address is changed without informing system 200, system 200 will recognize that a new host that has been detected is the same host that has just been moved on the network, rather than concluding the new IP address for the host represents a totally new host.

In an embodiment, for each host system 200 is observing, a 'steady ID' is computed. This steady ID can be based on, but is not limited to, one or more of: (1) uname (unix name); (2) results of a sysctl command; (3) network ports (e.g., tcp, udp, etc.) open for listening; (4) command-line information from non-volatile processes running on the host; and, (5) check sums and/or modification dates of configuration files, etc. that are typically stable. Additional information that is unlikely to change when a host is moved or re-instantiated (e.g., inside a virtual machine) may also be used. This steady ID fingerprint (or signature) can then be compared to newly observed hosts (or other operational elements) to determine if the newly observed element is the same as an existing element already under observation, or if it is accurately classified as a new operational element to be monitored.

In an embodiment, there may be limited changes to a steady ID when an operational element is re-instantiated (e.g., when a host changes IP address, etc.) In this case, one option is to require the exact steady ID fingerprint. This may work well for application processes. Another option is to set a threshold of similarity. For example, a new steady ID fingerprint may be 94% the same as an old (already under observation) fingerprint. If 94% is above a threshold selected for similarity, then the new element will be considered the same as the old element. If below, the new element will be considered a new instance. This option may work well when elements are upgraded.

To explain further, take an example of JIRA running on a host. System 200 has already identified the host using a steady ID. When system 200 observes a JIRA instance running on this host (in hierarchical knowledge, JIRA is a web application inside a web container which is a Java application running in a JVM instance on a host, etc.). System 200 can develop a fingerprint/signature of the JIRA instance from, but not limited to: (1) command line parameters; (2) connection to a particular database; (3) set of, and configuration of, typically stable plugins; and (4) JIRA itself. The fingerprint/signature can be based on other information. System 200 now has a steady ID for this instance of JIRA. This steady ID is combined with the steady ID of the host it's running on to generate a 'full' steady ID of this JIRA instance.

At this point, system 200 knows there is a JIRA instance running, and has a name for that instance of JIRA that is robust against small infrastructural changes, movements etc. Once changes in other operation elements or layers are substantial enough, system 200 may eventually re-identify (i.e., re-fingerprint) this instance of JIRA as another one. However, if the overall number of instances does not change, system 200 may determine that the new instance is the same as the old instance. In other words, for example, if, after a significant change, system 200 recognizes that there is still only one instance of JIRA running, system 200 can decide the new JIRA instance is the same as the old JIRA instance even if the fingerprints/signatures are not the same or meet the similarity criteria.

For example, a JIRA instance is moved to a different host, or the host it's running on is moved to a different network zone. In this case, system 200 would know that the moved instance is the same JIRA as the old instance. Typical, application performance management systems (APMs) would, by default, think it is a different one.

In an embodiment, system 200 can use more than a generated steady ID to recognize operational elements. Take, for example, a cluster of machines that do not talk one to one another on the network, but are clustered together by type or through a load balancer that system 200 does not know about. System 200 generates a grouping ID through knowledge that can be used to identify horizontal groups (clusters) as described above. This grouping ID can be based on, but is not limited to, one or more of: (1) uname (unix name); (2) results of a sysctl command; (3) network ports (e.g., tcp, udp, etc.) open for listening; and (3) cpu (processor identity), memory, disk parameters, resources available, etc.

System 200 understands that it is likely that groups of elements, such as a cluster, are auto-configured and provisioned in the same way. System 200's group ID fingerprinting/signature generation process determines if operational elements are of the same kind, and if they are, system 200 groups them into a cluster for further analysis.

In another example, system 200 knows that a JIRA instance needs a database. System 200 can observe a JIRA instance communicating with a database system by: (a) looking at its configuration; and/or (2) looking at its network traffic. System 200 may have discovered a database on a different host that, from the previous information, system 200 determines is a candidate that may match the database the JIRA instance is communicating with. System 200 can then 'wire' them together (i.e., associate the JIRA instance and the database instance) using a so called wiring ID of the database. The wiring ID can be based on, but is not limited to, one or more of: (1) database instance ID; (2) stable configuration parameters; and, (3) the set of plugins installed. System 200 has now generated a fingerprint of the database. System 200 associates the JIRA instance with this database by the wiring ID—which is robust to simple changes, firewalls and masked networking in general.

Figure 3:
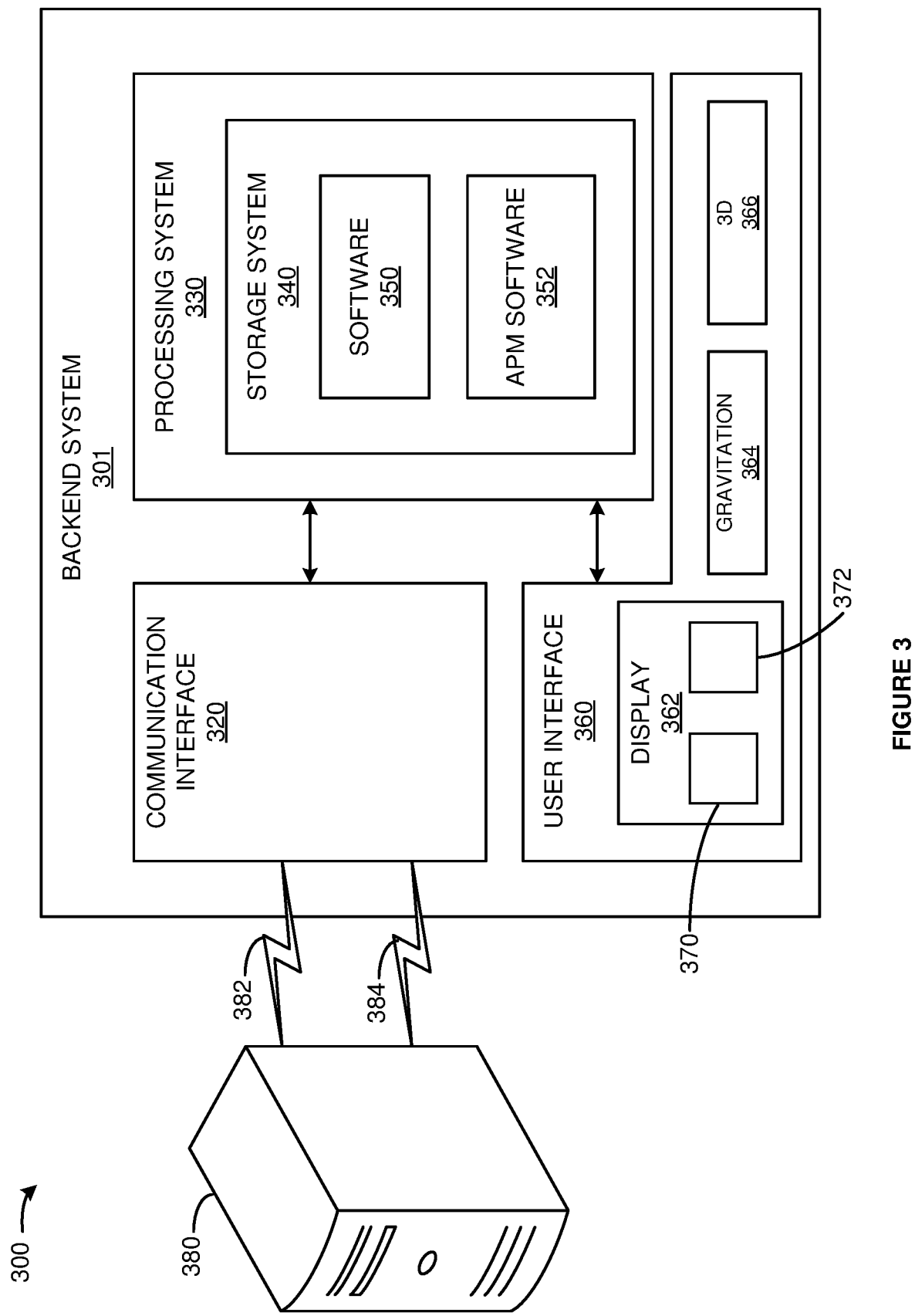
FIG. 3 is a block diagram illustrating a server processing application performance information.

FIG. 3 is a block diagram illustrating a server processing application performance information. In FIG. 3, application performance management system (APM) 300 includes client host 380 and backend system 301.

APM system 300 may operate as described herein. APM system 300 comprises backend system 301, client host system 380, communication link 382, and communication link 384.

Backend 301 includes communication interface 320, processing system 330, and user interface 360. Communication interface 320 is operatively coupled to host server 380 via communication link 382. Communication interface 320 is operatively coupled to at least one process running on host 380 via communication link 384.

Processing system 330 includes storage system 340. Storage system 340 stores software 350 and APM software 352. Storage system 340 also stores raw data and results generated by APM software 352 and/or host 380. Processing system 530 is linked to communication interface 320 and user interface 360.

Backend 301 could be comprised of a programmed general-purpose computer, although those skilled in the art will appreciate that programmable or special purpose circuitry and equipment may be used. Backend 301 may be distributed among multiple devices that together comprise elements 320-372.

Communication interface 320, may comprise one or more of: a network interface; wireless network interface; modem; wireless modem; port; telephone jack; telephone plug; transceiver; or, some other wired or wireless communication device. Communication interface 320 may be distributed among multiple communication devices.

Processing system 330 may comprise a computer microprocessor, logic circuit, or some other processing device. Processing system 330 may be distributed among multiple processing devices.

User interface 360 includes display 362, gravitation interface 364, and 3D interface 366. Display 362 displays indicia 370 and 3D rendered indicia 372. User interface 360 and its elements may be distributed among multiple user devices.

Storage system 340 may comprise a disk, tape, integrated circuit, server, or some other memory device. Storage system 340 may be distributed among multiple memory devices.

Processing system 330 retrieves and executes software 350 and APM software 352 from storage system 340. Software 350 may comprise an operating system, utilities, drivers, networking software, and other software typically loaded onto a computer system. Software 350 and/or APM software 352 could comprise an application program, firmware, or some other form of machine-readable processing instructions. When executed by processing system 330, APM software 352 directs processing system 330 to operate as described herein.

Figure 4:
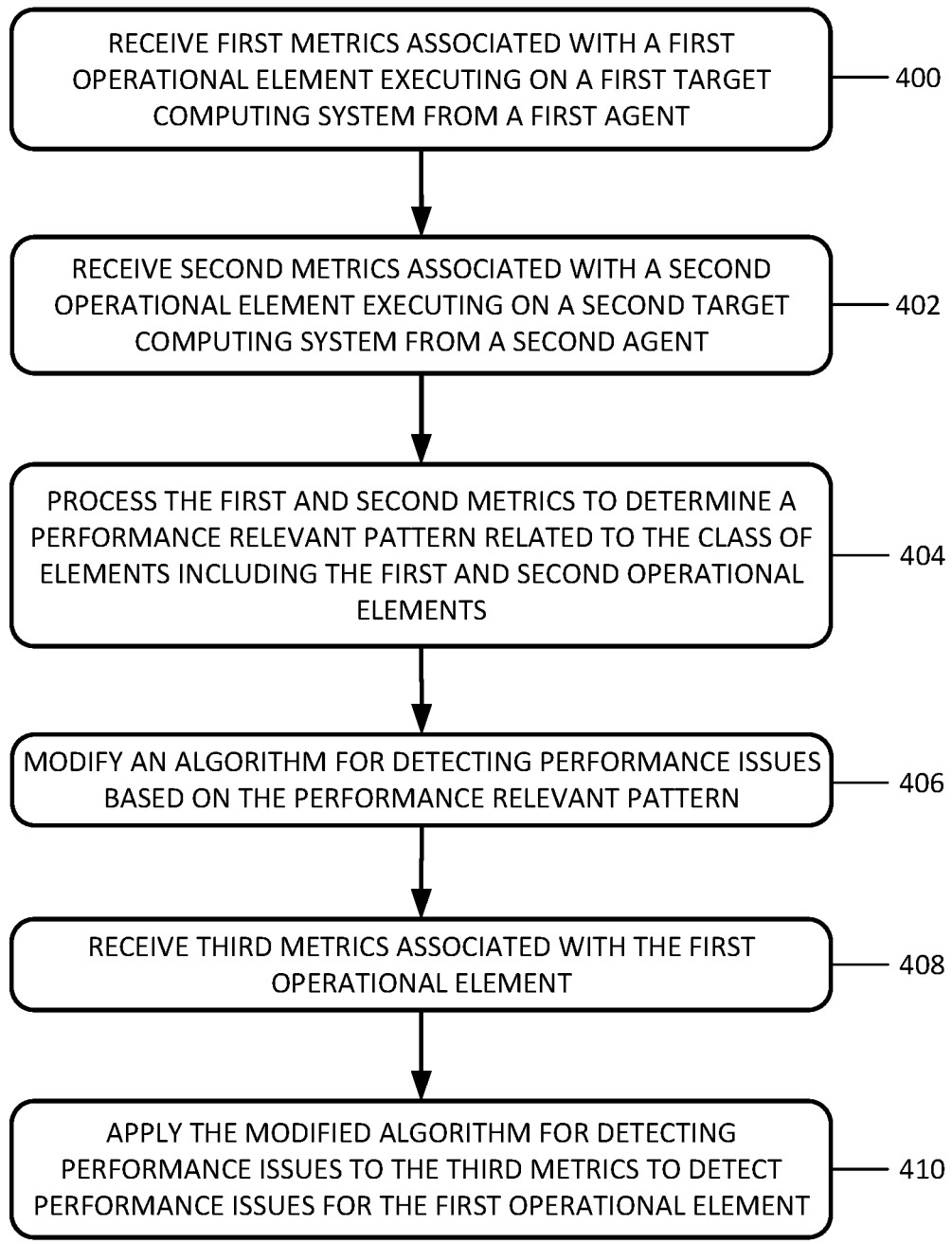
FIG. 4 illustrates a method of operating an application performance management system.

FIG. 4 illustrates a method of operating application performance management system 290. In this example method, application performance management system 290 receives first metrics associated with first operational element 211 executing on a first target computing system from a first agent 230, (operation 400). Application performance management system 290 also receives second metrics associated with second operational element 211 executing on a second target computing system from a second agent 230, (operation 402). The second operational element 211 is in a class of operational element including the first operational element 211.

In some embodiments, the first and second agents and the first and second target computing systems may be owned by different customers. In such an embodiment, there is no data sharing between the first and second target computing systems, but application performance management system 290 performs pattern sharing on the first and second metrics in order to recognize similar patterns within a class of sensors, and to recognize performance issues and errors in all sensors within the class.

Application performance management system 290 processes the first and second metrics to determine a performance relevant pattern related to the class of operational elements including the first and second operational elements 211, (operation 404). Application performance management system 290 modifies an algorithm for detecting performance issues within the class of operational elements based on the performance relevant pattern, (operation 406).

In other example embodiments, application performance management system 290 modifies an algorithm for predicting performance issues within the class of operational elements based on the performance relevant pattern, or modifies an algorithm for correcting performance issues within the class of operational elements based on the performance relevant pattern.

Application performance management system 290 then receives third metrics associated with the first operational element 211 from the first agent 230, (operation 408). Application performance management system 290 then applies the modified algorithm for detecting performance issues within the class of operational elements to the third metrics to detect performance issues for the first operational element 211, (operation 410).

In further example embodiments, application performance management system 290 also receives fourth metrics associated with a third operational element executing within a third target computing system from a third agent. The third operational element is also in the class of operational elements that includes the first and second operational elements. Application performance management system 290 then applies the modified algorithm for detecting performance issues within the class of operational elements to the fourth metrics to detect performance issues for the third operational element.

In some example embodiments, the first and second target computing systems are owned by different customers. In this situation, application performance management system 290 operates to insure that metrics received from one of the target computing systems are secured from access by the other target computing system. This allows application performance management system 290 to process the metrics to determine performance relevant patterns without violating the confidential nature of the metrics.

In another example embodiment, application performance management system 290 also received configuration information associated with each of the operational elements 211. This allows application performance management system 290 to process this configuration information with the metrics in determining a performance relevant pattern. This configuration information comprises such data as version of the operational element, configuration of the operational element, operational parameters, dependencies between operational elements, connections between operational elements, hierarchy of operational elements, and the like.

Figure 5A:
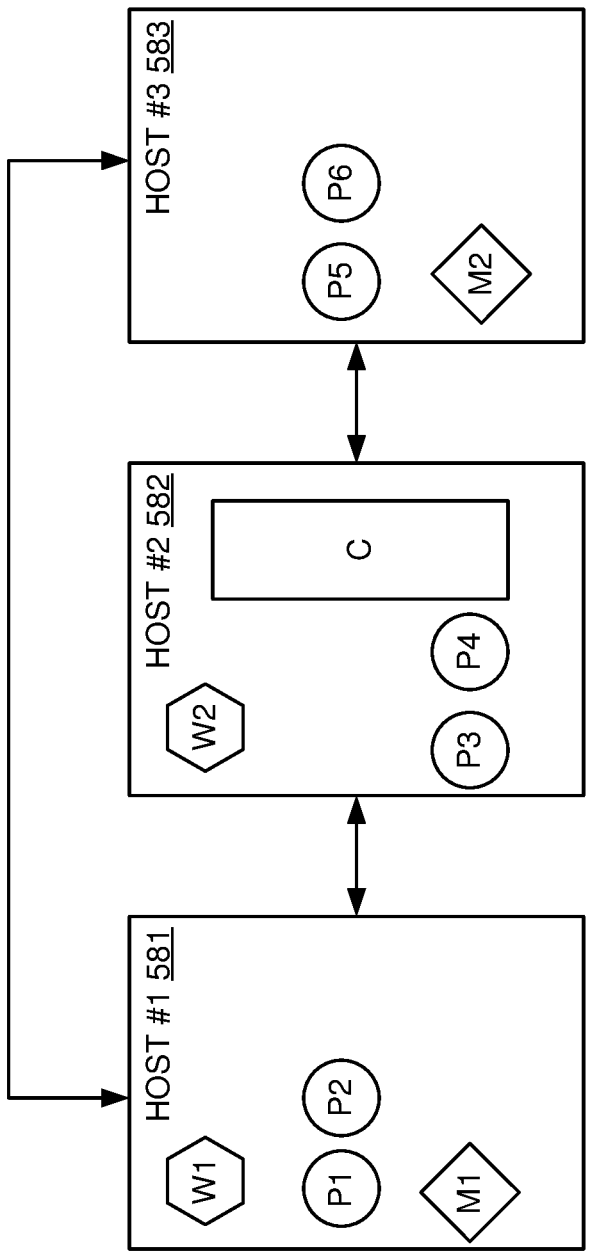
FIGS. 5A and 5B illustrate representations of the operation elements of a monitored application.
Figure 5B:
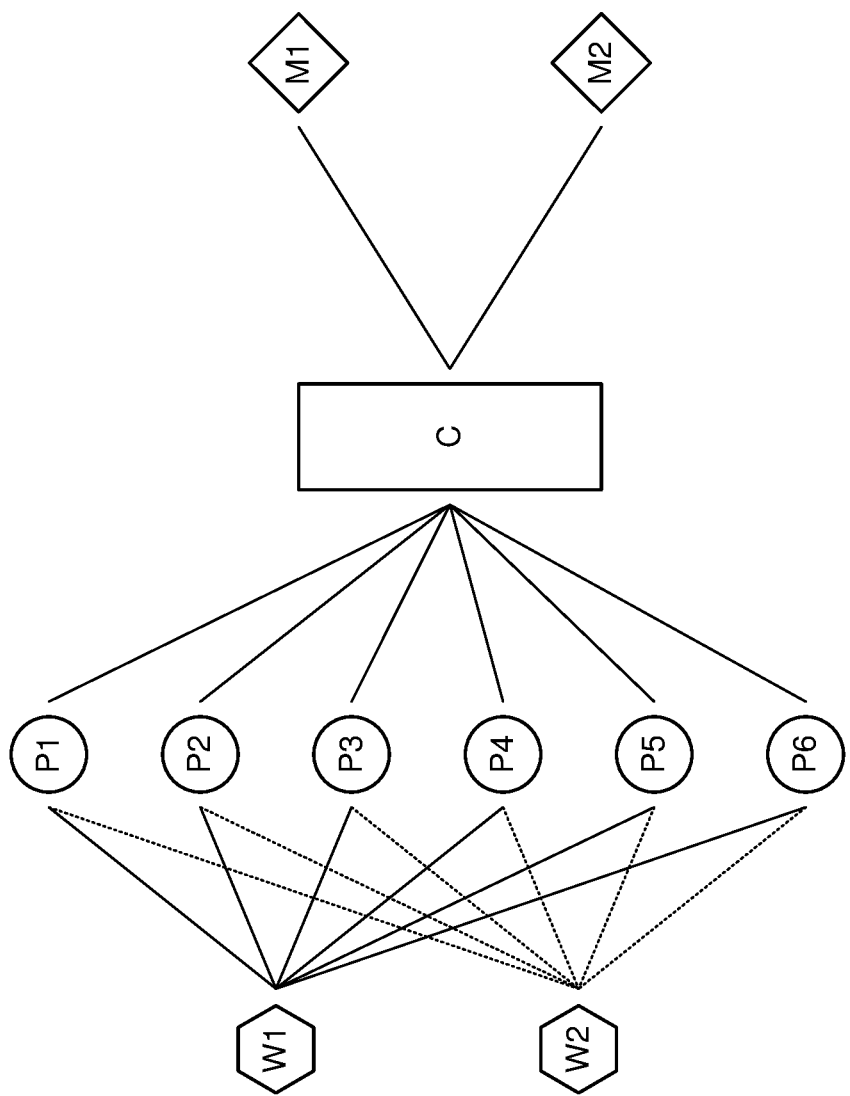

FIGS. 5A and 5B illustrate representations of the operation elements of a monitored application. The representation illustrated in FIGS. 5A and 5B may correspond to 3D rendered indicia 372 and indicia 370, respectively. In FIG. 5A, host #1 581, host #2 582, and host #3 583 are illustrated with (i.e., running) operational elements of several types. Host #1 581 includes hexagonal element W1, circle elements P1 and P2, and diamond element M1. Host #2 582 includes hexagonal element W2, circle elements P3 and P4, and rectangle element C. Host #3 583 includes circle elements P5 and P6, and diamond element M1. Host #1 581 is illustrated as being coupled to host #2 582 and host #3 583. Host #2 582 is illustrated as being coupled to host #1 581 and host #3 583. Host #3 583 is illustrated as being coupled to host #1 581 and host #2 581. Thus, FIG. 5A illustrates a physical grouping and arrangement of hosts 581-583. FIG. 5A does not illustrate how the elements (e.g., P1, P2, W2, etc.) running on hosts 581-583 communicate with each other logically.

In FIG. 5B, hosts 581-583 are not illustrated. The represented elements (e.g., P1, P2, W2, etc.) are the same as those illustrated in FIG. 5A. In FIG. 5B, each of hexagonal elements W1 and W2 are each illustrated as being coupled to each of circle elements P1-P6. Each of circle elements P1-P6 are illustrated as being coupled to rectangle element C. Rectangle element C is illustrated as being coupled to each of diamond elements M1 and M2. Thus, FIG. 5A illustrates a physical grouping and arrangement of hosts 581-583. FIG. 5B helps illustrate how the operational elements (e.g., P1, P2, W2, etc.) running on hosts 581-583 communicate with each other logically.

Figure 6:
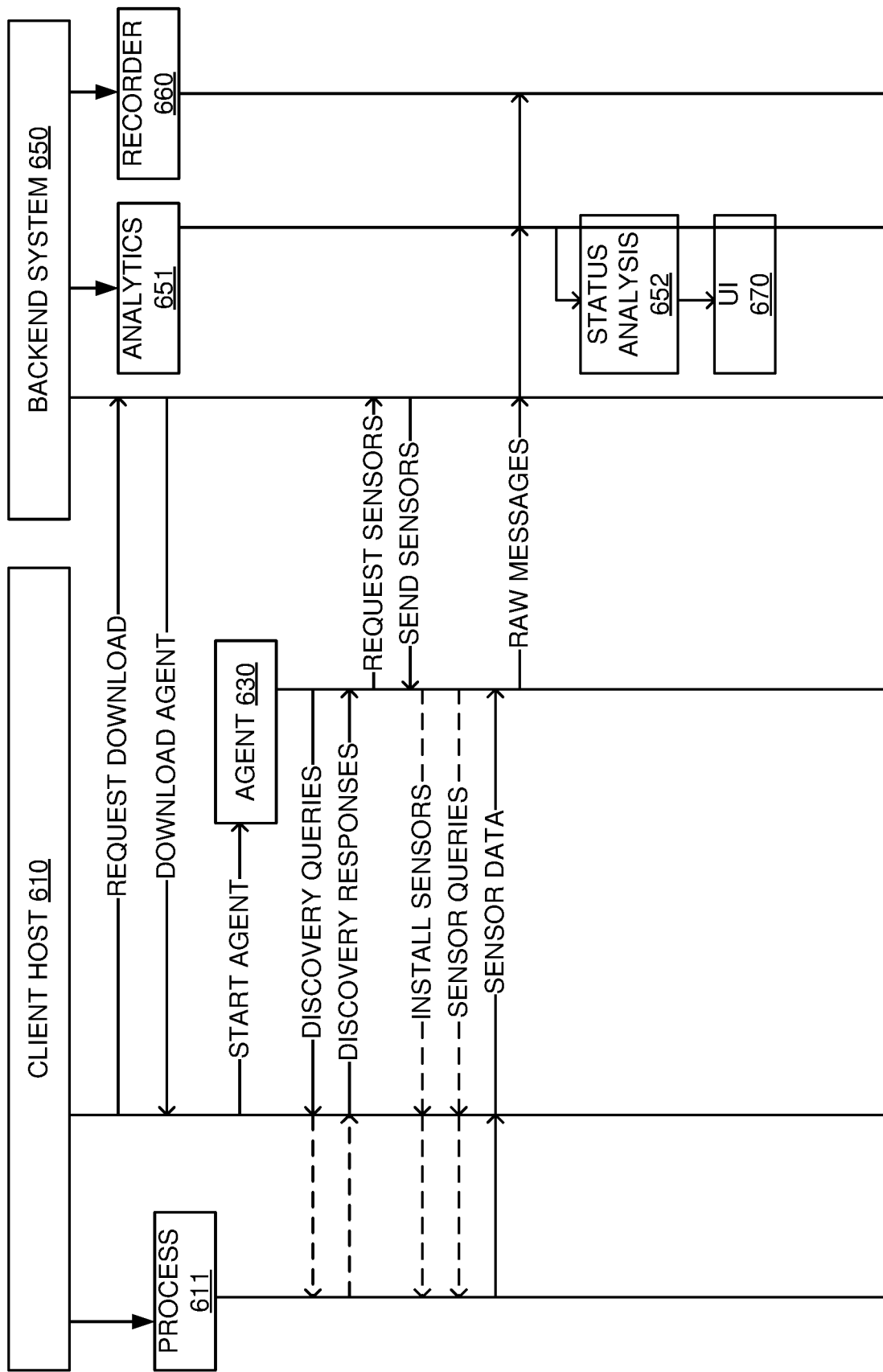
FIG. 6 is a flow diagram illustrating the operation of an application performance management system.

FIG. 6 is a flow diagram illustrating the operation of an application performance management system. In FIG. 6, client host 610 is running process 611 which is to be monitored etc. Backend system 650 includes processing 651 and recorder 660. To start monitoring, client host 610 requests a download of an executable binary from backend system 650. Backend system 650 provides executable for agent 630 to client host 610. Client host 610 runs the executable and an agent 630 process executes on client host 630. Agent 630 is an intelligent proxy between the host 610 and backend system(s) 650.

Agent 630 proceeds through a process called discovery. Discovery recognizes every element (system, software, communications etc.) on host 610. As part of the discovery process, agent 630 may make discovery queries to client host 610 and/or process 611. Client host 610 and/or process 611 may, as appropriate, provide responses to these discovery queries. Agent 630 uses these responses to recognize the operational elements of host 610 and the applications running thereon (e.g., process 611).

Once agent 630 determines the operational elements needed to monitor host 610 (and/or process 611), agent 630 requests sensors from backend 650. Backend 650 provides the requested sensors to agent 630. For example, agent 630 may determine process 611 is a running copy of JIRA. For every element recognized by agent 630, agent 630 requests a specific sensor from backend 650 and installs it adequately for the target element. The sensor is the component closely coupled with the observed element, that periodically provides metrics and meta information to agent 630. In the example case of JIRA, multiple sensors are requested, stepwise, for operational elements such as Java, Tomcat, MySQL etc.

In an embodiment, some sensors "run" within agent 630's process (i.e., the sensor is code executed by agent 630, for example periodically.) Examples of sensor that run within agent 630's process are a sensor for the host 610 (OS) or a sensor for agent 630 itself. Other sensors depend on the technology/application/software layer/etc. the sensor is to sense. Thus, a sensor may be run within the observed element (e.g., JVM, which implies JIRA, Tomcat etc.) or may be run as a separate process on client host 610. Sensors, if needed, report to the agent 630.

Where possible and necessary, a sensor may "inject" itself into the target element using the target element's native mechanisms. Some sensors just monitor a target by pulling some statistics the element provides through an API. For example, a statistics summary provided by process 611 via an HTTP interface. In another example, a target element may use a native UNIX to send statistics to itself. In this case a sensor may passively listen and resend the information sent to this socket to agent 630.

In an example, sensors may be installed inside a surrounding JVM process. This may be done even though some information can be collected from outside the JVM process. For example, a sensor may cause a Java agent to be natively loaded into a JVM process. This Java agent (which is native to Java and should be understood to be different from agent 630) brings sensors with it that understand JVM's own metrics. This Java agent also understands metrics provided by Tomcat which is the application, in this example, that runs using JVM as runtime. This Java agent also understands metrics relating to JIRA which is a web application registered with and managed by Tomcat. The variety of technologies that can be observed via sensor is very high, so it should be understood that additional approaches to observing operational elements may be used.

Once installed, agent 630 goes through all sensors it knows and collects metrics and meta information (i.e. queries) the sensors for data the sensors are ready to send to backend 650. This periodic message to backend 650 may be referred to as a "raw message". In case of JIRA, a raw message contains information/metrics of the host, the Java process, the Tomcat web container running in the process etc.

Once a raw message is received the backend 650, it gets published in a queue, where interested components of backend 650 can receive copies for further processing. An example interested component of backend 650 is recorder 660 (also called "raw recorder") which simply archives the raw message to disks.

Another interested component is processing 651 (which may also be called the "processor" or "analytics") is responsible for immediate processing of the raw message, and thus issue recognition and fix suggestion using a dynamic graph function. Processing 651 is a complex topology of streams where raw messages are inputs and different computation results are outputs until results (e.g., warnings, recognized issues, fix suggestions, etc.) are delivered to final listeners, or simply stored in the data store. In the example case of a monitored JIRA instance, processing 651 has a hierarchy of pluggable components that know how a typical JIRA setup is organized in terms of environment (e.g., JIRA has a database; JIRA runs in a web container, etc.). These components may be referred to as "hooks." These hooks register themselves for particular parts of the raw message, so they always get executed once the corresponding part appears.

From the raw messages, specific hooks extract all information needed to do issue recognition and fix suggestion for one particular piece of infrastructure. This information may include, but is not limited to inventory information that fills the abstract infrastructure idea with concrete names and instances; the metric values that matter for issue recognition, etc. In the example case of JIRA, metrics that are relevant to identify an issue include, but are not limited to: host metrics around CPU and memory, Java metrics around garbage collection and performance, Tomcat metrics around pools and named resources, MySQL metrics around database performance and bottlenecks, and the like. These metrics are extracted by independent hooks, so processing 651 not only can look at the status of JIRA, but also independently look at the status of Host 610 that an instance of JIRA is running on, ignoring all components in between.

Relevant metric values are typically collected in "windows" to simulate data samples on data streams. A window is a time-ordered set of metric values. Once collected and/or full according to configurable rules, the whole window of samples is sent through a number of functions that typically run statistical algorithms on it. These functions can be as simple as 5-numbers computation, or more sophisticated linear regression, and/or exponential smoothing, as well as outlier detection after smoothing the sample. The results of the computations on the windows can be sent downstream to other functions (e.g., status analysis 652) that make higher-order decisions etc.

In the example case of JIRA, the JIRA status recognition function computes everything related to JIRA. Plus, processing 651 has a higher-order function that "waits" for results from Tomcat status as well. The Tomcat status is again computed by a corresponding function based on pure Tomcat metrics plus JVM metrics, etc. down to the lowest possible level (e.g., host, hardware), hierarchically. The result of the JIRA check is "JIRA status." "Status" can be as simple as "how it feels right now according to memory data" or as complex as "it's yellow if we're out of memory in 3 minutes, and meanwhile the disk gets full and we can't get any new database connection through for the past 5 minutes." In an example, status is built from a color: green, yellow or red, plus all the information hierarchically collected through hooks on the way of recognition that is relevant to issue description and fix suggestion.

Once the status is computed by status analysis 652, backend 650 can store it together with the timestamp in a data store. This way, users can anytime through UI 670 ask questions such as "how did feel JIRA yesterday at 10 pm?" or "what's the normal behavior of JIRA through the whole day?" The status is also published for immediate representation in the UI, where the user can see the color identifying the hot spot in the operational element representation in the corresponding part of a map displayed by UI 670, plus clickable detailed information on the issue and the possible fix.

In addition, at any time, a user can label an issue identified by processing 651 as "not an issue" or overrule a selected colorization (e.g., this issue should be red instead of yellow). This is used by backend 650 to automatically adjust issue recognition parameters and algorithms in the processing 651, so that next time the same issue can be identified and a status selected that correspond to the user's expectations and/or experience. This helps avoiding false positive or negatives in a way that is specific to a particular user/customer.

The methods, systems, devices, networks, databases, wireless stations, and base stations described above may be implemented with, contain, or be executed by one or more computer systems. The methods described above may also be stored on a computer readable medium. Many of the elements of system 100, system 200, system 300, host 610, and backend 650 may be, comprise, or include computers systems.

Figure 7:
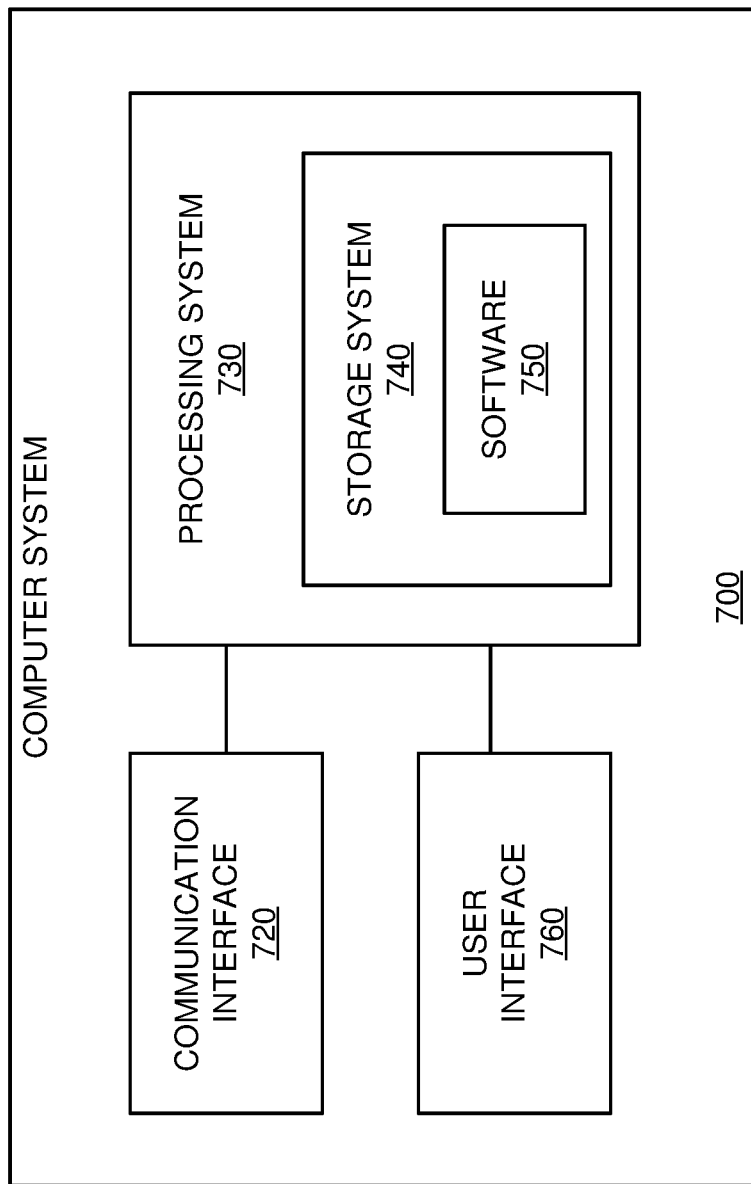
FIG. 7 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 may comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 may comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An application performance management system comprising:
   a communication interface, configured to communicate with one or more agents deployed within one or more target computing systems; and
   a processing system coupled with the communication interface, configured to:
      receive first metrics associated with a first operational element executing within a first target computing system from a first agent;
      receive second metrics associated with a second operational element executing within a second target computing system from a second agent, wherein the second operational element is in a class of operational elements including the first operational element;
      process the first and second metrics to determine a performance relevant pattern related to the class of operational elements including the first and second operational elements;
      modify an algorithm for detecting performance issues within the class of operational elements based on the performance relevant pattern;
      receive third metrics associated with the first operational element; and
      apply the modified algorithm for detecting performance issues within the class of operational elements to the third metrics to detect performance issues for the first operational element.

2. The application performance management system of claim 1, wherein the processing system is further configured to:
   modify an algorithm for predicting performance issues within the class of operational elements based on the performance relevant pattern; and
   apply the modified algorithm for predicting performance issues within the class of operational elements to the third metrics to predict a performance issue for the first operational element.

3. The application performance management system of claim 1, wherein the processing system is further configured to:
   modify an algorithm for correcting performance issues within the class of operational elements based on the performance relevant pattern; and
   apply the modified algorithm for correcting performance issues within the class of operational elements to the third metrics to correct the performance issue for the first operational element.

4. The application performance management system of claim 1, wherein the processing system is further configured to:
   receive fourth metrics associated with a third operational element executing within a third target computing system from a third agent, wherein the third operational element is in the class of operational elements including the first and second operational elements; and
   apply the modified algorithm for detecting performance issues within the class of operational elements to the fourth metrics to detect performance issues for the third operational element.

5. The application performance management system of claim 1, wherein the first and second target computing systems are owned by different customers, and metrics received from one of the target computing systems are secured from access by the other target computing system.

6. The application performance management system of claim 1, wherein the processing system is further configured to:
   receive first configuration information associated with the first operational element;
   receive second configuration information associated with the second operational element; and
   process the first and second metrics and the first and second configuration information to determine the performance relevant pattern.

7. The application performance management system of claim 6, wherein the configuration information includes at least one from the group of: a version, a configuration, an operational parameter, a dependency, a connection, and a hierarchy.

8. A method of operating an application performance management system, comprising:
   receiving first metrics associated with a first operational element executing within a first target computing system from a first agent;
   receiving second metrics associated with a second operational element executing within a second target computing system from a second agent, wherein the second operational element is in a class of operational elements including the first operational element;
   processing the first and second metrics to determine a performance relevant pattern related to the class of operational elements including the first and second operational elements;
   modifying an algorithm for detecting performance issues within the class of operational elements based on the performance relevant pattern;
   receiving third metrics associated with the first operational element; and
   applying the modified algorithm for detecting performance issues within the class of operational elements to the third metrics to detect performance issues for the first operational element.

9. The method of claim 8, further comprising:
   modifying an algorithm for predicting performance issues within the class of operational elements based on the performance relevant pattern; and
   applying the modified algorithm for predicting performance issues within the class of operational elements to the third metrics to predict a performance issue for the first operational element.

10. The method of claim 8, further comprising:
    modifying an algorithm for correcting performance issues within the class of operational elements based on the performance relevant pattern; and
    applying the modified algorithm for correcting performance issues within the class of operational elements to the third metrics to correct the performance issue for the first operational element.

11. The method of claim 8, further comprising:
    receiving fourth metrics associated with a third operational element executing within a third target computing system from a third agent, wherein the third operational element is in the class of operational elements including the first and second operational elements; and applying the modified algorithm for detecting performance issues within the class of operational elements to the fourth metrics to detect performance issues for the third operational element.

12. The method of claim 8, wherein the first and second target computing systems are owned by different customers, and metrics received from one of the target computing systems are secured from access by the other target computing system.

13. The method of claim 8, further comprising:
receiving first configuration information associated with the first operational element;
receiving second configuration information associated with the second operational element; and
processing the first and second metrics and the first and second configuration information to determine the performance relevant pattern.

14. The method of claim 13, wherein the configuration information includes at least one from the group of: a version, a configuration, an operational parameter, a dependency, a connection, and a hierarchy.

15. One or more non-transitory computer-readable media having stored thereon program instructions to operate an application performance management system, wherein the program instructions, when executed by processing circuitry, direct the processing circuitry to at least:
receive first metrics associated with a first operational element executing within a first target computing system from a first agent;
receive second metrics associated with a second operational element executing within a second target computing system from a second agent, wherein the second operational element is in a class of operational elements including the first operational element;
process the first and second metrics to determine a performance relevant pattern related to the class of operational elements including the first and second operational elements;
modify an algorithm for detecting performance issues within the class of operational elements based on the performance relevant pattern;
receive third metrics associated with the first operational element; and
apply the modified algorithm for detecting performance issues within the class of operational elements to the third metrics to detect performance issues for the first operational element.

16. The one or more non-transitory computer-readable media of claim 15, wherein the program instructions further direct the processing circuitry to at least:
modify an algorithm for predicting performance issues within the class of operational elements based on the performance relevant pattern; and
apply the modified algorithm for predicting performance issues within the class of operational elements to the third metrics to predict a performance issue for the first operational element.

17. The one or more non-transitory computer-readable media of claim 15, wherein the program instructions further direct the processing circuitry to at least:
modify an algorithm for correcting performance issues within the class of operational elements based on the performance relevant pattern; and
apply the modified algorithm for correcting performance issues within the class of operational elements to the third metrics to correct the performance issue for the first operational element.

18. The one or more non-transitory computer-readable media of claim 15, wherein the program instructions further direct the processing circuitry to at least:
receive fourth metrics associated with a third operational element executing within a third target computing system from a third agent, wherein the third operational element is in the class of operational elements including the first and second operational elements; and
apply the modified algorithm for detecting performance issues within the class of operational elements to the fourth metrics to detect performance issues for the third operational element.

19. The one or more non-transitory computer-readable media of claim 15, wherein the first and second target computing systems are owned by different customers, and metrics received from one of the target computing systems are secured from access by the other target computing system.

20. A method of identifying a status for an operational element, comprising:
collecting a first plurality of metrics associated with a first operational element running on a first host;
collecting a second plurality of metrics associated with a second operational element running on a second host;
modifying an expert rule based on the first plurality of metrics and the second plurality of metrics; and,
applying the modified expert rule to determine a selected status for the first operational element.

\* \* \* \* \*